Patented Feb. 23, 1932

1,846,124

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE

Application filed April 3, 1929. Serial No. 352,112.

This invention relates to brakes, and is illustrated as embodied in a novel cam lever for an internal expanding automobile brake. An object of the invention is to provide an inexpensive but effective brake-operating lever adapted for use with a brake having a shiftable anchorage. Preferably the lever, which is adapted to be mounted on a pivot at one end, comprises a pair of spaced-apart side members between which are mounted a pair of generally-square and preferably concave-faced thrust members adapted to engage the shoe ends. I prefer to bring the side members together at the end of the lever, to give a relatively small bearing on the pivot, so that the lever may have sufficient rocking movement on the pivot to prevent binding.

The above and other objects and features of the invention, including various novel and desirable details of construction, will be apparent from the following description of the illustrative embodiment shown in the accompanying drawings, in which.

Figure 1:
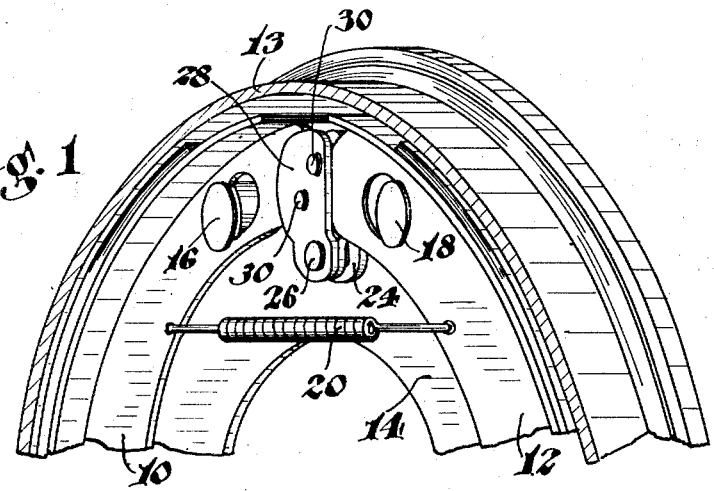
Figure 1 is a perspective of the upper part of a brake assembly, in which my novel cam lever is used as part of the applying means.
Figure 2:
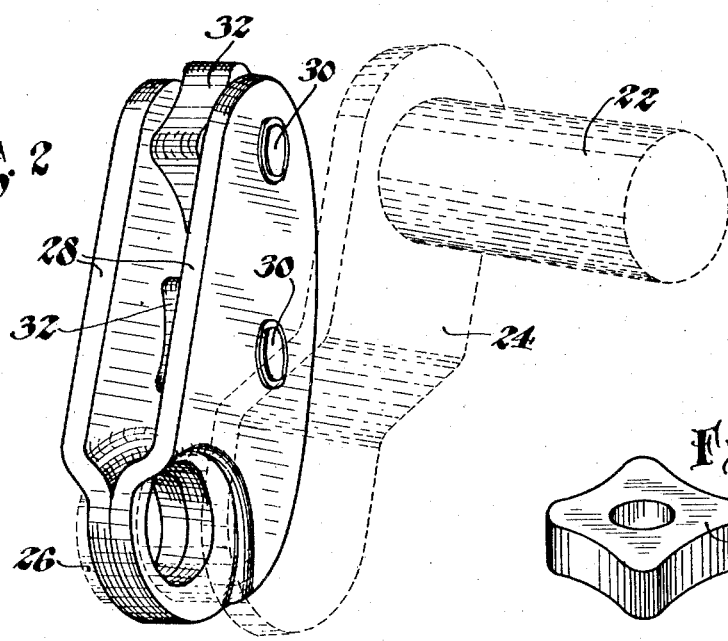
Figure 2 is a perspective of the novel lever, with the operating shaft and its crank arm shown in dotted lines.
Figure 3:
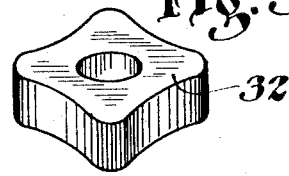
Figure 3 is a perspective of one of the generally-square concave-faced thrust blocks.

The brake illustrated in Figure 1, and of which the drum 13 is shown in part, includes a pair of connected shoes 10 and 12 carried by a backing plate 14, shoe 10 anchoring on a post 16 carried by the backing plate when the drum is turning clockwise, and shoe 12 anchoring on a post 18 carried by the backing plate when the drum is turning counter-clockwise. The brake is applied, against the resistance of a return spring 20, by novel means operated by a shaft 22 journaled in a bearing carried by the backing plate and having a crank arm 24 provided with a pivot pin 26.

The above-described brake is more fully described, and is claimed as an organized structure, in my prior application No. 304,196, filed September 6, 1928. The present application relates to a novel brake-operating lever mounted on the pivot 26 or its equivalent, considered as a separate article of manufacture.

This novel brake-operating lever comprises a pair of side members 28, spaced apart at least in the body of the lever, between which are pivoted on transverse pins 30 a pair of generally-square thrust members or blocks 32, preferably formed with concave faces slidably engaging the rounded ends of the shoes 10 and 12. I prefer to bring the lower ends of side members 28 together, at their pivotal mounting on the pivot 26, so that their bearing on the pivot is of such small axial extent that the necessary and usual tolerances will allow sufficient play so that the lever may rock sufficiently on the pivot to prevent binding.

While one illustrative embodiment has been described in detail, it is not my intention to limit the scope of the invention to that particular embodiment or otherwise than by the terms of the appended claims. It is not my intention to claim in the present application any of the subject-matter of prior applications Nos. 212,601 and 254,651.

I claim:

1. A brake-operating lever comprising side portions having a pair of generally-square concave-faced thrust blocks mounted between them.

2. A brake-operating lever comprising side portions having a pair of generally-square concave surfaced thrust blocks pivotally mounted between them.

3. A brake-operating lever comprising a pair of side members engaging each other at one end of the lever and adapted to be mounted on a pivot at said end of the lever and being spaced apart in the body of the lever, and having a pair of generally-square concave-faced thrust blocks pivoted between them.

4. A brake-operating lever comprising a pair of side members engaging each other at one end of the lever and being spaced apart in the body of the lever, and having a pair of generally-square concave-faced thrust blocks pivoted between them.

5. A brake-operating lever comprising a pair of side members engaging each other at one end of the lever and adapted to be mounted on a pivot at said end of the lever and being spaced apart in the body of the lever, and having a pair of generally-square thrust blocks pivoted between them.

6. A brake-operating lever comprising a pair of side members engaging each other at one end of the lever and being spaced apart in the body of the lever, and having a pair of generally-square thrust blocks pivoted between them.

7. A generally-square concave-faced thrust block for a brake-operating lever.

8. A generally-square concave-faced thrust block having parallel side-faces for a brake-operating lever having a central pivot-embracing opening.

9. A brake operating lever comprising an arm and a generally polygonal concave-surfaced thrust block secured thereto.

10. A brake operating lever comprising side portions having a pair of generally polygonal concave surfaced thrust blocks mounted between them.

11. A brake operating lever comprising side portions having a pair of generally polygonal concave surfaced thrust blocks pivotally mounted between them.

12. A generally polygonal concave surfaced thrust block for a brake operating lever.

13. A thrust block for a brake operating lever formed with a plurality of concave faces.

14. A thrust block for a brake operating lever formed with a plurality of concave faces and a central bearing portion.

In testimony whereof, I have hereunto signed my name.

LUDGER E. LA BRIE.